Feb. 7, 1928.
W. G. HOWE
CORN POPPING MACHINE
Filed July 26, 1926    2 Sheets-Sheet 1
1,658,486
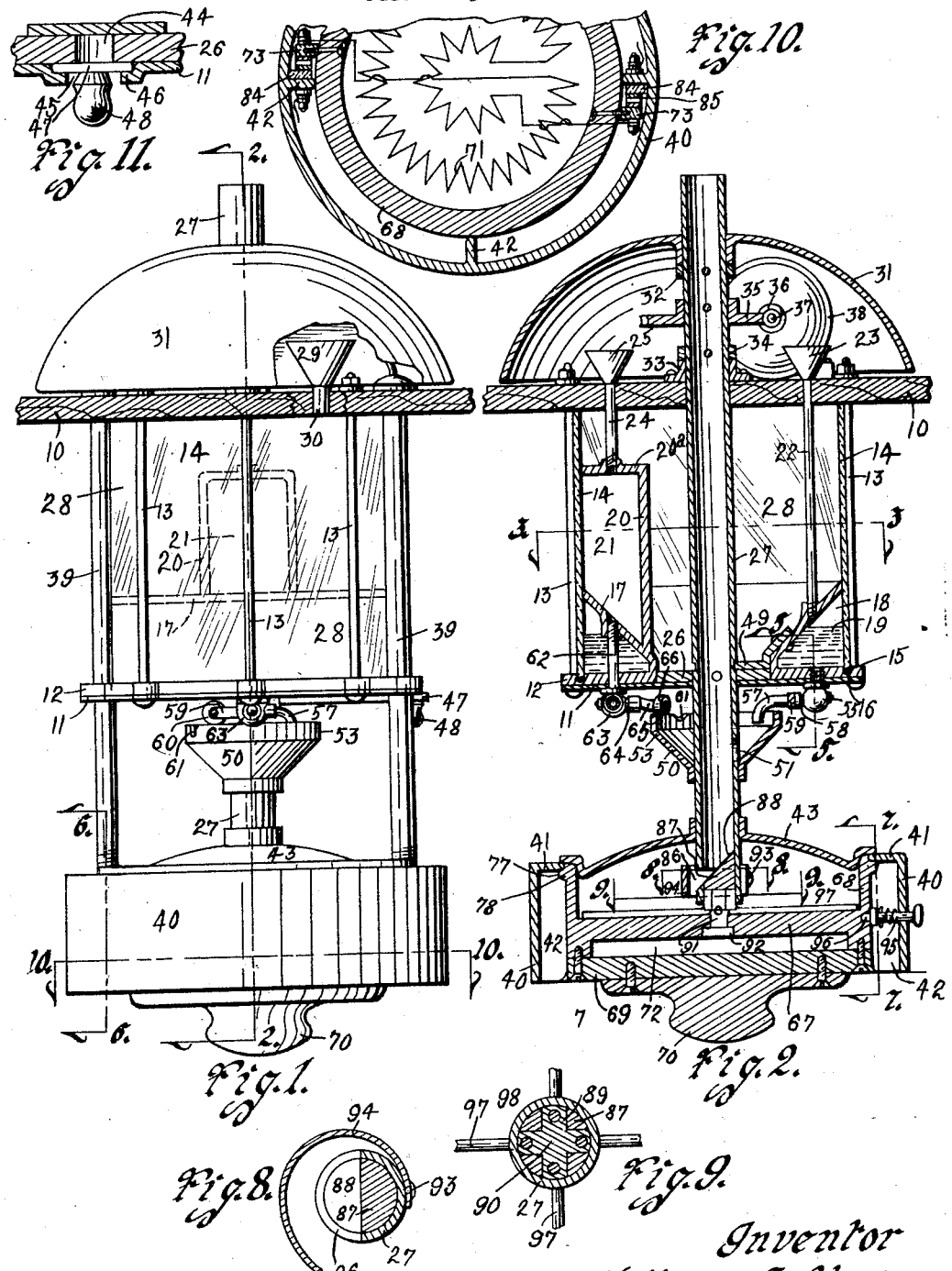

Feb. 7, 1928.
W. G. HOWE
1,658,486
CORN POPPING MACHINE
Filed July 26, 1926
2 Sheets-Sheet 2
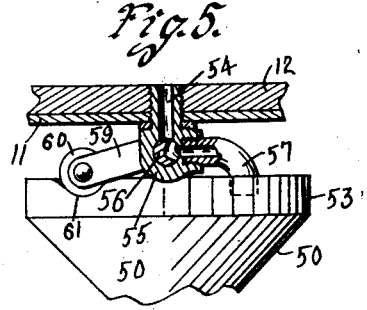
Fig.5.
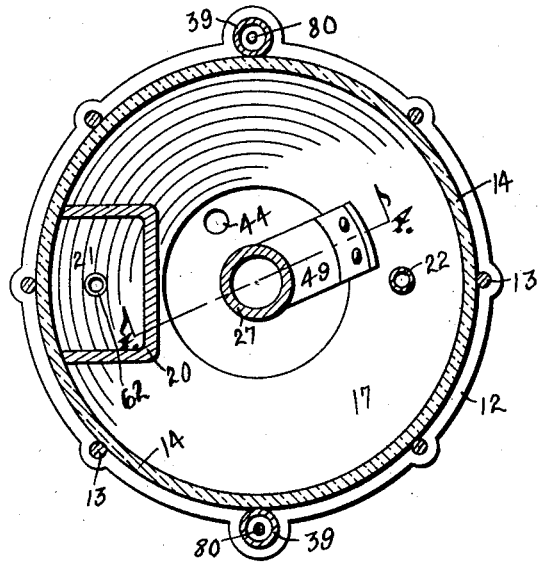
Fig. 3.
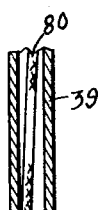
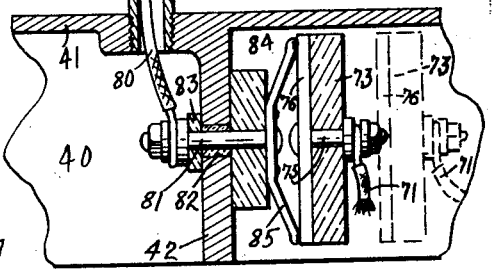
Fig.6.
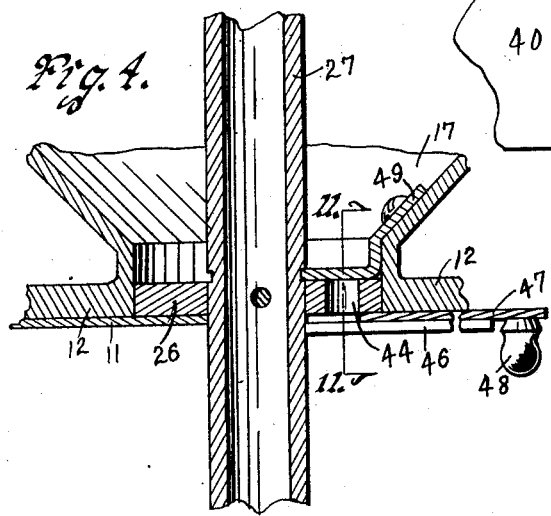
Fig. 4.
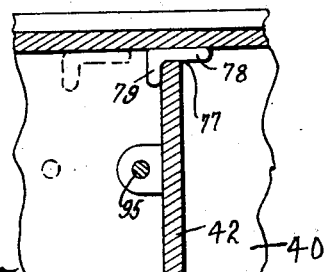
Fig.7.
Witness
L. F. Sandberg
Inventor
William G. Howe
by Bair & Freeman Attorneys Patented Feb. 7, 1928.

1,658,486

UNITED STATES PATENT OFFICE.

WILLIAM G. HOWE, OF DES MOINES, IOWA.

CORN-POPPING MACHINE.

Application filed July 26, 1926. Serial No. 124,963.

My invention relates to corn popping machines.

It is my object to provide a corn popping machine having its parts so constructed and arranged that the machine may be started and the operation of supplying the corn to the popping chamber, discharging it therefrom, and supplying butter and salt to the corn, will be automatically performed.

Another purpose of my invention is to provide a corn popping machine of the type in which the grains of corn are automatically supplied to the receptacle in which they are popped.

It is another of my objects to provide in such a machine a novel means for automatically supplying salt to the corn during the process.

Still another object is to automatically control the supplying of melted butter or suitable oil to the corn.

A further purpose of my invention is to provide a novel assembly for the corn, salt and butter containers, and to provide a suitable pipe for carrying the fumes from the popping corn away from the corn popping chamber.

Still another object is to provide a novel form of corn popper pan and a convenient structure for mounting it on and removing it from the other parts.

Still another object is to provide in such a machine suitable mechanism for operating the corn agitating means.

With these and other objects in view, my invention consists in the construction, arrangement and combination of the various parts of my corn popping machine, whereby the objects contemplated are attained, as hereinafter more fully set forth, pointed out in my claims, and illustrated in the accompanying drawings, in which:

Figure 1 is a side elevation of a corn popping machine embodying my invention, the top of the casing therefore being shown in section, and parts being broken away.

Figure 2 is a vertical, detail, sectional view taken on the line 2—2 of Figure 1.

Figure 3 is a horizontal, sectional view taken on the line 3—3 of Figure 2.

Figure 4 is a detail, sectional view taken on the line 4—4 of Figure 3.

Figure 5 is a vertical, sectional view taken on the line 5—5 of Figure 2.

Figure 6 is a vertical, sectional view taken on the line 6—6 of Figure 1.

Figure 7 is a vertical, sectional view taken on the line 7—7 of Figure 2.

Figure 8 is a horizontal, sectional view taken on the line 8—8 of Figure 2.

Figure 9 is a similar view taken on the line 9—9 of Figure 2.

Figure 10 is a horizontal, sectional view taken on the line 10—10 of Figure 1; and Figure 11 is a vertical, sectional view taken on the line 11—11 of Figure 4.

It is my purpose to provide a corn popping machine to be used for popping corn on a commercial scale. For this purpose, I expect to mount the machine described herein on a cart and to then enclose most of the mechanism in a suitable casing, preferably with glass walls. I explain this for the purpose of making clear the general environment of the mechanism now to be more particularly described. I have not shown the casing, excepting the top thereof, which is indicated in the accompanying drawings by the reference numeral 10 and which is shown to illustrate the relation of the corn popping mechanism to the casing.

It will be noted that the corn popping mechanism is mounted on the top 10 of the casing in which most of the machine is enclosed.

My machine comprises means for popping corn, means for automatically supplying the corn to the popper pan, means for automatically supplying salt and butter to the corn, and means for carrying the fumes out of the casing.

I provide below the casing top member 10 a metal disc or the like 11 on which rests an annular flat ring 12. The metal disc 11 and ring plate 12 are supported from the top 10 by means of suitable rods 13. A glass cylinder 14 serves as a spacer between the top 10 and the ring plate 12. The lower edge of the glass cylinder 14 is received in a groove 15 in the upper surface of the ring plate 12. This groove is provided with a gasket 16, as shown for instance in Figure 2.

At the inner edge of the ring plate 12 is formed an upwardly and outwardly inclined annular flange 17, which forms a cone-shaped funnel member, as shown in Figures 2 and 4.

The upper edge of the flange 17 fits snugly against the glass cylinder 14 and underneath the flange 17 and above the ring plate 12 is formed an annular chamber or container 18 to receive melted butter, corn oil or the like 19.

Formed on the flange 17 is an upwardly, projecting three-sided container member 20, having the top 20ª. The container member 20 cooperates with a portion of the glass cylinder 14 for forming a compartment or container 21 for salt.

An intake tube 22 extends from the compartment 18 upwardly through the flange 17 and through the top 10 and is provided at its upper end with a funnel 23, through which oil or melted butter or the like may be supplied to the compartment 18.

A tube 24 extends upwardly from the compartment 21 through the top 10 and is provided at its upper end with a similar funnel 25, through which salt may be supplied to the compartment 21.

The space at the middle of the ring plate 12 is filled by a disc 26 fixed to a tube 27, which extends through the metal disc or plate 11, the disc 26 and through the top 10 as shown in Figure 2.

Within the glass cylinder 14 is the pop corn compartment 28. A funnel 29 is supported on the top 10 and has its tubular portion 30 extending through the top 10 for supplying shelled corn to the pop corn compartment 28.

Mounted on the tube 27 above the top 10 is an inverted glass bowl or the like 31, which covers the mechanism above the top 10 and rests on a collar 32 on the tube 27. The inverted ball 31 may be removed for gaining access to the parts above the top 10.

On the top of the top 10 is a bearing 33 through which the tube 27 extends and on the bearing 33 is a collar 34, which limits the downward movement of the tube 27 through the bearing 33. On the tube 27 is a worm wheel 35, which meshes with a worm 36 on the shaft 37 of a motor 38 supported on the top 10 under the glass bowl 31.

It will be seen that the tube 27 can thus be rotated when the motor is turned on, and it will be understood that the tube is rotatably mounted in the discs 11 and 26 in the top 10.

At the lower end of the tube 27 is the popping pan, the agitator and the heating means.

Extending downwardly from the top 10 just on the inside of the cylinder 14 are diametrically opposite posts 39, which project downwardly below the pop corn compartment 28, as shown in Figure 1. Supported at the lower ends of the posts 39 is the pan support 40.

The pan support 40 consists of a cylinder having at its upper end the inwardly projecting, annular flange 41 into which the lower ends of the posts 37 are screwed. The pan support 40 has a plurality of spaced, vertical webs or flanges 42 projecting inwardly as shown in Figures 2 and 10.

Mounted on the lower end of the tube 27 to slide vertically is a pan cover 43.

Before describing the popper pan, I will explain the manner in which the pop corn, melted butter and salt are automatically fed downwardly through the tube 27.

In the disc 26, which rotates with the tube 27 is a hole 44, shown for instance in Figure 4. In the sheet metal disc 11 is a radially arranged slot 45. (See Figure 11). The material of the disc 11 at the edges of the slot 45 is shaped to form slideways or guides 46 for a sliding gate 47 on which is a handle 48. (See Figures 4 and 11).

Secured on the flange 17 is a cover plate 49, a portion of which rests on the disc 26, as shown in Figure 4. Thus when the compartment 28 contains corn and the tube 27 is rotated from the motor 38, a few grains of corn will drop into the hole 44 and slide around on the disc 11 until the hole 44 registers with the slot 45, whereupon if the sliding gate 27 is open, such grains of corn will drop through the slot. The cover plate 49 is arranged above the slot 45, so that no corn can pass from the compartment 28 into the hole 44 during the time the corn is being discharged from the hole 44.

The corn drops down into a cone-shaped hopper or container 50 mounted on the tube 27 and thence through an opening 51 in the wall of the tube 27 to the interior of the tube, and thence downwardly to the popping pan, which will be hereafter described. The hopper 50 has a vertical, annular flange 53 at the top.

For discharging melted butter from the compartment 18, I provide the following means:

A tube 54 extends from the bottom of the compartment 18 downwardly through the ring plate 12 and disc 11 and is connected with a valve casing 55, in which is a valve 56, and thence with a discharge tube or spout 57 arranged to discharge into the hopper 50, as shown in Figure 5.

The stem 58 of the valve 56 projects through the wall of the casing 55. Secured to the outer end of the stem 58 at right angles thereto is an arm 59 on which is a roller 60 traveling on the upper edge of the flange 53, which is provided with a notch 61. When the roller 60 drops into the notch 61, the valve is opened for allowing oil to pass into the hopper 50, but as soon as the roller 60 passes out of the notch 61, the valve is closed.

For feeding salt to the hopper 50, there is provided a tube 62 extending from the bottom of the salt compartment 21 downwardly through the compartment 18, the ring plate 12 and the disc 11 and connected at its lower end with a valve casing 63, similar to the valve casing 55. In the valve casing 63 is a valve similar to the valve 56, having the stem 64 similar to the stem 58. On the stem 64 is an arm 65 similar to the arm 59, having on its end a roller 66 similar to the roller 60 riding on the flange 53. When the roller 66 drops into the notch 61, the salt flow control valve is opened for allowing the salt to flow through a discharge spout or the like similar to the spout 57.

It will thus be seen that I have provided valve controlled passages from the butter and salt compartments for discharging into the hopper 50 and thus into the tube 27 and therethrough to the popping pan. The valves are controlled by the rotation of the tube 27 for automatically controlling the supply of melted butter or oil or salt according to the speed of the operation of the machine.

Referring now to the popper pan, I have provided such a pan having the bottom 67 and the peripheral walls 68. (See Figure 2.) The pan has a second or lower bottom 69 detachably mounted on it by means of screws 70 or the like and on the under side of the second bottom 69 is mounted a handle 70 of wood or other material, which is a poor conductor of heat.

Between the main bottom 67 of the popping pan and the bottom member 69, I mount a heating unit, comprising a coil or the like 71, as shown in Figure 10. The ends of the heating coil 71 project through the wall of the heat unit compartment, which compartment I have indicated by the reference numeral 72.

Mounted on the outside of the popping pan are blocks 73 of insulation, as shown for instance in Figure 10. Binder posts 75 extend through the blocks 73 as shown for instance in Figure 6, and the ends of the heating coil 71 are secured to these posts.

At the other ends of the posts and on the opposite sides of the blocks of insulation 73 are contact plates 76, as shown in Figure 6.

The corn popping pan is of such size as to be slipped upwardly from below between the webs or ribs 42 and to fit snugly in such position. At the upper edges of the webs 42 at their inner portions are notches 77. At the upper edge of the wall 68 of the popper pan are outwardly projecting flanges 78, having downwardly projecting lugs 79, as shown for instance in Figure 7.

In mounting the popper pan on the support 40, the pan is slipped upwardly from below between the webs or flanges 42. The popper pan is then rotated until the flanges 78 slide into the notches 77 for holding the pan in position. The lugs 79 limit the rotary movement of the popper pan after the members 78 have entered the notches 77.

The posts 39 are tubular and conducting wires 80 connected with a suitable source of electrical energy are extended through them and connected with binding posts 81. These binding posts 81 are extended through opposite webs or flanges 42 and are insulated therefrom by bushings 82 and washers 83.

On each binding post 81 is mounted a block of insulation 84 carrying a spring contact 85.

When the pan is inserted up into the holder and rotated until it is locked in position, the contact plates 76 engage the contact points 85 for connecting the heating unit 71 with the wires 80.

Mounted on the lower end of the tubular shaft 27 is the agitator for the pop corn. In the lower end of the tubular shaft 27 is a slot 86 shown in Figure 2. Received in the lower end of the shaft 27 is a block 87, the upper edge of which is beveled as at 88 to discharge corn through the slot 86. Formed in the under surface of the block 87 is a socket 89, which may be in the form of a Greek cross. Received in the socket 86 is a block 90 having the form of a Greek cross from which there extends downwardly a cylindrical portion 91, which projects through the bottom 67, as shown in Figure 2, and has secured on to its lower end a head 92. The block 90 is thus mounted on the pan. When the pan is inserted into its support, it is rotated until the block 90 registers properly with the socket 89, and the pan can then be further rotated for locking it in position. Such further rotation imparts limited rotation to the tube 27 for the reason that the block 87 is fastened to the tube 27 by means of a screw or the like 93.

A piece of curled spring steel or the like 94 is fastened to the tubular shaft 27 by means of the screw 93. This member 94, which I call a guard, extends around the tubular shaft 27, spaced therefrom except at its point of connection therewith, and serves to protect the slot 86 and keep the popped corn out of the slot and to move the popped corn away from the slot sufficiently to allow the discharge of raw pop corn.

I shall now describe in greater detail the operation of my improved corn popping machine.

Pop corn is supplied to the pop corn compartment 28 through the funnel 29, salt is supplied to the salt compartment 20 through the funnel 25 and tube 24, and suitable oil or melted butter is supplied to the appropriate compartment 18 through the funnel 23 and tube 22.

The corn popping pan is inserted upwardly into the support 40, is rotated until the block 90 registers with the socket 89 in the block 87, and is then shoved upwardly until the members 78 register horizontally with the notches 77, whereupon the pan is rotated until the members 78 enter the notches 77 and further rotary movement of the pan is prevented by the lugs 79. When the pan has reached this position, it is locked there by means of a spring actuated plunger 95, slidably mounted in the support 40, as shown in Figure 2. The plunger 95 enters a recess 96 in the wall of the pan. This plunger holds the pan in position where it can not be accidentally rotated, and where the plates 76 contact with the points 85.

The current is turned on through the heating unit 71 and after the pan has been heated for the proper length of time, the motor 38 is started. The motor imparts rotation to the tubular shaft 27 and through the blocks 87 and 90 to the agitators. The agitators consist of stiff spring wires 97, which extend radially from the lower part of the block 87 and travel around the bottom 67 of the corn popping pan.

The inner ends of the stiff wire agitators 97 are bent upwardly as at 98 and are fixed in the arms of the block 90. The rotation of the tubular shaft 27 thus actuates the agitating wires 97.

The rotation of the tubular shaft 27 also rotates the disc 26, which is fixed to the shaft. As the disc 26 rotates, raw corn drops into the hole 44 and slides on the disc 11 until the hole 44 registers with the slot 45 in the disc 11.

Assuming that the sliding closure member 47 has been moved to open position, the corn then drops downwardly into the hopper 50 from the hole 44 through the slot 45. The hole 44 is covered by the cover member 49 during the time it registers with the slot 45.

Thus with each rotation of the tube 47, a limited number of grains of corn are dropped into the hopper 50. These pass through the opening 51 in the wall of the shaft 27 and thence downwardly through the shaft 27 to the beveled face 88 of the block 87 and thence into the popping pan.

The rotation of the shaft 27 carries with it the hopper 50. The rotation of the hopper 50 imparts rocking movement to the stems of the valves, which control the outlet passages from the butter compartment 18 and the salt compartment 21, thus permitting salt and melted butter in limited amounts to drop into the hopper with each rotation of the shaft 27. The salt and melted butter are thus mixed with the corn and dropped downwardly through the lower end of the tubular shaft 27 to the popping pan.

The corn is agitated by the wires 97 and is popped on account of the heat from the unit 71. As the volume of pop corn increases, it pushes upwardly the cover member 43, which can slide freely on the tubular shaft 27. Some of the pop corn gradually escapes the upper, outer edge of the pan over the flange 41 and drops into the main casing, which is not shown, except as to a portion of its top 10.

This operation can be automatically continued as long as an additional supply of popped corn is required and as long as the supply of raw corn, salt and butter lasts.

The machine can be started up and will then operate automatically without attention from the user for a very considerable time. The user can take care of his customers without paying constant attention to the machine.

It is obvious that the machine is of relatively simple construction. The ingredients for the popped corn can be easily and readily replenished by lifting up the bowl-shaped cover member 31.

The entire device may be enclosed within a main casing, so that the entire operation may be performed without touching any of the ingredients with the hands and without projecting the popped corn through dust or dirt in the air.

After the parts have once been properly adjusted, the machine will properly pop corn with a minimum attention from the operator.

The corn popping pan can be readily and easily removed even when it is hot by grasping the wooden handle 70, pulling out the plunger 95, and rotating the pan until the members 78 clear the notches 77 in the flanges 42.

One desirable feature of the structure herein disclosed is found in the tubular character of the shaft 27 and the fact that its upper, open end is so arranged as to discharge into the atmosphere. The fumes of the popping corn are thus taken out of the main casing or machine and discharged into the air. This is desirable because it is not desirable to keep the fumes within the cabinet or casing and the aroma of popping corn in the air is found a good, suggestive means for arousing the appetites of prospective customers in the neighborhood.

It will be obvious that the sliding closure member 47 may be closed whenever desired to prevent the supplying of additional raw corn to the popping pan.

There are a number of other advantageous features about the construction disclosed in my corn popping machine.

For example, attention is called to the fact that the flange 17 not only forms a wall for the compartment 18 for melted butter or oil, but also affords a conical bottom for the corn compartment 28. It thus follows that with a corn compartment having its bottom thus tapered, all of the corn will be fed to the moving disc 26, so that the full capacity of the corn compartment may be used and all of the corn discharged therefrom without special attention.

With a construction of this kind, while the feed is in a sense intermittent, it is in another sense continuous. The amount of corn, melted butter or salt fed at each operation of the feeding mechanisms is very small, and the feeding operations are repeated at very short intervals, so that there is really a continuous feed of small amounts. This affords a more satisfactory method of popping corn than is possible where a full charge for the corn popping pan is supplied at a time.

It is desirable that the corn should be heated for about a minute and a half to two minutes, and that when popped, it should be discharged from the popping pan.

With a device of this kind, the corn popping operation is continuous and about the same amount of corn per minute is popped.

I have found by actual experiment that where a full charge for the corn popping pan is put in at a time, the results are not as good as when the corn is fed continuously in small amounts. Where a full charge is put into the pan at a time, there are more grains which shrivel up and do not pop. In this connection, there is, of course, a great advantage is continuously feeding the corn and melted butter or oil simultaneously to the popping pan. Experience shows that the best results can be secured by popping corn in the oil, and it is desirable to supply the oil and corn simultaneously to the heated pan by a substantially continuous, simultaneous feeding operation.

It may be noted that all the features are visible so that the operator of the machine can readily determine that they are operating.

Another feature of this machine which is of importance lies in the fact that the "old maids" or unpopped grains of corn are never discharged into the main casing with the popped corn. They remain in the popping pan and may be taken out and thrown away when the pan is removed from its support.

The quick detachability of the pan thus has a number of advantages. It makes possible the easy removal of the unpopped corn grains. It makes it easy to take out the pan for cleaning or repairs. This latter feature is important in connection with the fact that the heating element is mounted in the pan bottom, so that the pan may be easily taken out and access can be had to the heating element for purposes of repair or replacement.

The continuous feed has another advantage from the commercial standpoint, because in the operation of my machine, there is a continuous discharge of popped corn from the popping pan over the edge of the support in the shape of a round waterfall. This is attractive to the public and is valuable for advertising purposes.

It is perhaps important to call attention to the great simplicity of my operating mechanism and particularly to the fact that all of the feeds are operated directly from the single tubular shaft.

Changes may be made in the details of the construction and arrangement of the parts of my improved corn popping machine without departing from the real spirit and purpose of my invention, and it is my intention to cover by my claims any modified forms of structure or use of mechanical equivalents, which may be reasonably included within their scope.

I claim as my invention:

1. In a corn popping machine, a corn popping pan, means for applying heat to said pan, a rotatable hollow shaft for automatically supplying raw corn, salt and oil through the shaft to the pan, means carried by the shaft for agitating the corn in the pan, and a cover for the pan slidably mounted so that it may be pushed upwardly for permitting the discharge of popped corn when the volume of popped corn increases to a certain point.

2. In a corn popping machine, a raw corn compartment, a tubular shaft, means for imparting rotation to said shaft, a corn popping pan support, a corn popping pan mounted on said support, means for discharging corn into said pan when the shaft is rotated, a hopper mounted on said shaft below said compartment, said shaft having an opening through which corn may be discharged from the hopper into the lower part of the shaft, and means for discharging corn from the compartment into the hopper when the shaft is rotated.

3. In a corn popping machine, a raw corn compartment, a tubular shaft, means for imparting rotation to said shaft, a corn popping pan support, a corn popping pan mounted on said support, means for applying heat to said pan, means for discharging corn into said pan through the shaft when the shaft is rotated, a salt compartment, and means for discharging salt therefrom through the shaft into the corn popping pan when the shaft is rotated.

4. In a corn popping machine a raw corn compartment, a tubular shaft, means for imparting rotation to said shaft, a corn popping pan support, a corn popping pan mounted on said support, means for applying heat to said pan means for discharging corn through the shaft into said pan when the shaft is rotated, an oil compartment, and means for discharging oil through the shaft into the corn popping pan when the shaft is rotated.

5. In a corn popping machine, a raw corn compartment, a tubular shaft, means for imparting rotation to said shaft, a corn popping pan support, a corn popping pan mounted on said support, means for applying heat to said pan, means for discharging corn through the shaft into said pan when the shaft is rotated, a salt compartment, means for discharging salt therefrom through the shaft into the corn popping pan when the shaft is rotated, an oil compartment, and means for discharging oil through the shaft into the popping pan when the shaft is rotated.

6. In a corn popping machine, a raw corn compartment, a tubular shaft, means for imparting rotation to said shaft, a corn popping pan support, a corn popping pan mounted on said support, means for applying heat to the pan, means for discharging corn into said pan when the shaft is rotated, and a corn agitator connected with the lower end of said shaft for agitating corn in the pan.

7. In a corn popping machine, a raw corn compartment, a tubular shaft, means for imparting rotation to said shaft, a corn popping pan support, a corn popping pan mounted on said support, means for discharging corn into said pan when the shaft is rotated, a salt compartment, and means for discharging salt therefrom into the corn popping pan when the shaft is rotated, said last means comprising a hopper on said shaft, a passage for discharging salt from the salt compartment into the hopper, a valve in said passage, and means for actuating said valve according to the rotation of the hopper with the shaft, said shaft having an opening in its wall for permitting discharge from the hopper to the inside of the shaft.

8. In a corn popping machine, a raw corn compartment, a tubular shaft, means for imparting rotation to said shaft, a corn popping pan support, a corn popping pan mounted on said support, means for discharging corn into said pan when the shaft is rotated, an oil compartment, and means for discharging oil into the corn popping pan when the shaft is rotated, said means comprising a hopper on said shaft, a passage from the oil compartment for discharging into the hopper, a valve in said passage, means for actuating said valve according to the rotation of the hopper, said shaft having an opening in its wall for permitting discharge from the hopper to the inside of the shaft.

9. In a corn popping machine, a casing top, a corn popping mechanism mounted thereon including a tubular shaft extended through said top, a corn popping pan support, a corn popping pan mounted on said support, said shaft being adapted to discharge into said pan, a raw corn compartment, means for discharging corn therefrom into the pan when the shaft is rotated and means on the shaft adjacent to its discharge opening for moving corn in the pan away from the shaft, comprising a curved finger projecting from the shaft and spaced radially therefrom except at its point of attachment.

10. In a corn popping machine, a corn popping pan support having circumferentially spaced, upright flanges provided at their upper edges with notches, a corn popping pan having projecting members adapted to be received in said notches, means for locking the pan against rotation when the pan is mounted on the support, contact points mounted on said upright members, a heating unit in the bottom of said pan, contact members on the pan and connected with said heating unit and arranged to engage said contact point when the pan is mounted on the support.

11. In a device of the class described, a corn popping pan supporting device having tubular supporting members and having upright, circumferentially spaced flanges provided at their upper edges with notches, a corn popping pan provided with laterally projecting members adapted to be received in said notches, a heating element mounted in the bottom of said pan, means for connecting said heating element with conducting wires when the pan is installed on said support.

12. In a corn popping machine, a raw corn compartment, a tubular shaft, means for imparting rotation to said shaft, a corn popping pan support, a corn popping pan mounted on said support, and means for discharging corn into said pan when the shaft is rotated, said means comprising a disc mounted on said shaft just above the bottom of said compartment and provided with a hole, the bottom of said compartment having a slot, said tube having a hopper thereon below said compartment and being provided with an opening for permitting the discharge of corn from the hopper to the interior of the tube.

13. In a corn popping machine, a corn popping pan, means for heating the pan, a hollow shaft discharging into the pan, and means for simultaneously, automatically supplying raw corn and oil through the shaft to the pan.

14. In a corn popping machine, a corn popping pan, a hollow shaft for discharging into the pan, means for simultaneously, automatically supplying raw corn and oil through the shaft to the pan and means on the shaft for agitating the corn in the pan.

15. In a corn popping machine, a corn popping pan, means for heating the pan, a hollow shaft for discharging into the pan, means for automatically, simultaneously supplying raw corn and salt through the shaft to the pan.

16. In a corn popping machine, a corn popping pan, means for heating the pan, a hollow shaft arranged to discharge into the pan, means for continuously, automatically, simultaneously supplying raw corn and oil through the shaft to the pan.

17. In a corn popping machine, a corn popping pan, means for heating the pan, a hollow shaft for discharging into the pan, means for continuously, automatically simultaneously, supplying raw corn and salt through the shaft to the pan.

18. In a corn popping machine, a corn popping pan, means for applying heat to the pan, a hollow shaft for discharging into the pan, and means for continuously, automatically, simultaneously supplying raw corn and salt and oil through the shaft to the pan.

19. In a corn popping machine, a pan support, a pan, said support and pan having cooperating means for detachably connecting them together, so that the pan may be lowered away from the support and removed therefrom, an electrical heating element in the pan bottom, coacting contacts on the pan and support, arranged to be automatically disconnected when the pan is so removed.

20. In a corn popping machine, a pan support, contacts thereon, a pan, coacting contacts thereon, said support and pan having cooperating means for connecting them together, so that the pan may be lowered away from the support and removed therefrom and the respective contacts disconnected, and means for automatically supplying corn to the pan and for agitating the corn therein.

21. In a corn popping machine, a pan support, contacts thereon, a pan, coacting contacts on the pan, said support and pan having cooperating means for connecting them together, so that the pan may be lowered away from the support and removed therefrom and the respective contacts disconnected, means for agitating the corn in the pan.

22. In a corn popping machine structure, a casing top, a tubular shaft extending therethrough, a corn popping pan support, a corn popping pan mounted thereon, a cover on said shaft for the corn popping pan, said shaft serving as a direct vent from the corn popping pan through the casing top.

23. In a corn popping machine, a cylindrical receptacle having a bottom and a false inclined bottom member whereby there is formed one compartment above said cone-shaped member, the contents of which will slide down the cone-shaped member, and another compartment below it, a hopper below said receptacle, both compartments being provided with means for discharging into the hopper, a tubular shaft extended through the hopper having a hole in its wall near the bottom of the hopper.

24. In a corn popping machine, a cylindrical receptacle having a bottom and a false inclined bottom member, whereby there is formed one compartment above said member, the contents of which will slide down the cone-shaped member, and another compartment below it, a hopper below said receptacle, both compartments being provided with means for discharging into the hopper, a tubular shaft extended through the hopper having a hole in its wall near the bottom of the hopper, means for rotating said shaft, a popping pan below said shaft, and an agitator carried by the shaft.

25. In a corn popping machine, a corn popping pan, heating means therefore, a rotatably mounted shaft arranged to discharge into said pan, a fixed hopper surrounding said shaft, said shaft having a hole above the bottom of the hopper, and means for automatically supplying corn to the hopper.

26. In a corn popping machine, a corn popping pan, heating means therefore, a rotatably mounted shaft arranged to discharge into said pan, a fixed hopper surrounding said shaft, said shaft having a hole above the bottom of the hopper, and means for supplying corn and oil to the hopper.

27. In a corn popping machine, a corn popping pan, heating means therefore, a rotatably mounted shaft arranged to discharge into said pan, a fixed hopper surrounding said shaft, said shaft having a hole above the bottom of the hopper, and means for automatically supplying oil and salt to the hopper.

28. In a corn popping machine, a popping pan, a hollow shaft with its discharge end adjacent to the bottom of the pan provided with a discharge slot and a guard member carried by the shaft projecting across the slot spaced therefrom.

29. In a corn popping machine, a popping pan, a rotatably mounted hollow shaft with its discharge end adjacent to the bottom of the pan formed with a discharge slot and a guard member carried by the shaft projecting across the slot spaced therefrom and adapted to rotate with the shaft to move corn in the pan away from the slot.

30. In a corn popping machine, a support, a popping pan, coacting contacts on the support and pan, coacting means on the support and pan for connecting them together and for permitting the pan to be lowered away from the support and separated therefrom and disconnecting the respective contact points.

31. In a corn popping machine, a fixed support, a corn popping pan, said support and pan having coacting parts for detachably connecting them together and for permitting the pan to be lowered away and separated from said support, a vertically mounted rotary hollow shaft for supplying corn to said pan, and an agitator carried by said shaft.

Des Moines, Iowa, May 14, 1926.

WILLIAM G. HOWE.